United States Patent [19]

Mochizuki et al.

[11] Patent Number: 5,064,651
[45] Date of Patent: Nov. 12, 1991

[54] PROCESS FOR THE PREPARATION OF ENZYME CONTAINING HARD CANDY

[75] Inventors: Keizo Mochizuki; Naoki Sumi, both of Kawasaki, Japan

[73] Assignee: Meiji Seika Kaisha, Ltd., Tokyo, Japan

[21] Appl. No.: 412,731

[22] Filed: Sep. 26, 1989

[30] Foreign Application Priority Data

Sep. 26, 1988 [JP] Japan .................. 63-238891

[51] Int. Cl.⁵ .......................... A61K 9/68; A61K 9/14
[52] U.S. Cl. .................................... 424/440; 424/488
[58] Field of Search ............... 424/439, 440, 464, 465, 424/488; 426/656, 660

[56] References Cited

FOREIGN PATENT DOCUMENTS 2051483 5/1969 France .
48-28067(A) 8/1973 Japan .

Primary Examiner—Thurman K. Page
Assistant Examiner—G. S. Kishore
Attorney, Agent, or Firm—Armstrong, Nikaido, Marmelstein, Kubovcik & Murray

[57] ABSTRACT

A process for the preparation of a hard candy containing an enzyme is disclosed, which comprises steps of preparing an unusual hard candy containing no enzyme, crushing the same into particles, mixing the enzyme with the candy particles, press treating the mixture to form a shaped mass, putting the mass into a pressure vessel, heating the vessel under pressurized inert gas to cause a partial melt of the mass, cooling the vessel to make the mass into the hard candy product, and releasing the pressure in the vessel.

4 Claims, No Drawings

PROCESS FOR THE PREPARATION OF ENZYME CONTAINING HARD CANDY

BACKGROUND OF THE INVENTION

1. Field of the Invention

The present invention relates to a process for the preparation of a hard candy which contains an enzyme and more particularly, to a hard candy, in which the enzyme is uniformly dispersed therein and which is excellent in mouth feel.

2. Related Art

An enzymatic preparation in the form of a tablet, powder, capsule or the like may be given to a person who often experiences bradypepsia (i.e., slow digestion) due to a remarkable reduced ability to masticate food or who has a constitutional predisposition to ozostomy (i.e., bad breath) due to a food residue left in the mouth. In order to simplify the administration or intake of the enzyme, a hard candy containing the enzyme has been developed, in lieu of the drug type preparations.

In general, the hard candy containing the enzyme has been prepared by preparing a usual candy mass with use of mainly saccharide materials such as sucrose, corn syrup and the like. The candy mass is then crushed to prepare granules, and the granules are mixed with an enzyme, and the mixture is press shaped into a desired form.

This conventional process has a disadvantage that the saccharide material exists in the form of granule in the resulting candy product to give a rough mouth feel which is quite different from a usual hard candy product to be prepared through a melting and solidifying steps.

Therefore, another process, wherein the enzyme is added directly to the saccharide material, has been proposed. However, this process has a disadvantage that the enzyme may be inactivated by a thermal denaturation in the step for concentrating the saccharide material containing solution into a candy base.

SUMMARY OF THE INVENTION

A basic object of the invention is to provide a process for the preparation of a hard candy which contains an enzyme therein and shows an excellent mouth feel.

Another object of the invention is to provide a process for the preparation of a hard candy containing an enzyme therein, which exhibits the reduction of enzymatic activity in both of its preparation steps and during shelf-life under room temperature.

A still further object of the invention is to provide a process for the preparation of a hard candy containing an enzyme, in which pressurized gas is entrapped in the form of fine bubbles to issue pleasant sounds, as it dissolves in the mouth, so that a consumer can consume the enzyme with a certain amount of pleasure consumer can consume the enzyme with a certain amount of pleasure avoiding some of the stigma associated with taking the drug dosage.

According to the invention, the objects can be attained by a process for the preparation of a hard candy containing an enzyme, which comprises steps of mixing saccharide materials with water, concentrating the same to make its moisture content not higher than 3.0% by weight, cooling the concentrate to cause solidification thereof, crushing the resulting candy mass to make into candy particles having a size passing through 100 mesh standard sieve by the Japanese Industrial Standards (JIS), adding and mixing about 1 part by weight of an enzyme with 100 parts by weight of the candy particles, press shaping the particle mixture into a candy mass, putting the mass in a pressure vessel, charging an inert gas into the pressure vessel to set an inner pressure of the vessel at a pressurized state, heating the vessel to cause a partial melt of the candy mass, cooling the vessel to solidify the partially melted candy mass and to convert the same into the desired candy product in the vessel, and then releasing the pressure in the vessel to take out the candy product.

As the raw saccharides, conventionally employed materials such as sugar, corn syrup, lactose and the like may be listed. There is no specific limitation regarding the ratio of the saccharides, but in general, a ratio of 60–30 parts by weight of sugar, 30–40 parts by weight of millet jelly and not higher than 30 parts by weight of lactose is suitable.

For carrying out the process of the invention, in the first place, the saccharides are mixed and dissolved in water and the resulting mixture is concentrated, so as to make a moisture content thereof not higher than 3.0% by weight, with use of a steam kettle, vacuum kettle or continuous steam cooker to obtain a candy melt. The basis for defining the moisture content at such a level lies in that a hard candy prepared with use of a candy melt having a moisture content higher than 3.0% by weight may soften under room temperature causing deformation. To the candy melt or concentrate, a flavor, coloring agent and similar additives may be added and then the candy melt is cooled to solidify the same.

The resulting hard candy mass is then crushed with use of a disc-type mill or the like to obtain fine particles passing through 100 mesh JIS standard sieve. The basis for defining the particle size to pass through a 100 mesh sieve allows for a uniform dispersion of the enzyme in the final candy product.

Then, the enzyme is added to the mass of candy particles and the components are mixed. The enzyme is at least one enzyme selected from the group consisting of cellulase, amylase, protease, lipase, lysozyme and dextranase depending on the purpose of accelerating digestion, preventing an issuance of ozostomy, cleaning the oral cavity or the like. It is preferable to add the enzyme in the form of powder to obtain a uniform dispersion, and in the amount of about 1 part by weight to 100 parts by weight of the candy particles, to avoid a rough feel when the final candy product dissolves in the mouth.

The mixture consisting of the candy particles and enzyme powder is charged into a die of a pressure shaping machine for making the same into a mass or a piece with a desired form, under a pressure of 50–500 kg/cm$^2$. If the pressure is less than 50 kg/cm$^2$, it may be difficult to maintain the form of the shaped mass. It is unnecessary to set the pressure higher than 500 kg/cm$^2$, although there is no specific upper limitation.

The resulting shaped mass is put into the pressure vessel, and an inert gas such has carbon dioxide gas, nitrogen gas or the like is charged in the pressure vessel to set the inner pressure of 1–50 kg/cm$^2$ and more preferably of 5–50 kg/cm$^2$. The pressure vessel is heated from its outside to raise temperature of the shaped mass to 100–140° C. and to cause a partial melt thereof. If the pressure is less than 1 kg/cm$^2$, inactivation of the enzyme, due to the heat cannot be prevented. There is no upper limitation to the pressure setting, but it is unnecessary to set the pressure higher than 50 kg/cm$^2$, in view of cost therefor. If the temperature of the shaped mass is less than 100° C., the desired partial melt thereof will not occur and it is not preferable to set the temperature higher than 140° C., since the desired partial melt can be attained at a temperature lower than such temperature, and for preventing a possible inactivation of the enzyme.

After the pressure vessel is cooled to room temperature to cause a solidification of the partial melt candy mass containing the enzyme therein, the inert gas in the vessel is released to take out the desired candy product containing the enzyme therein.

The resulting candy product entraps therein the enzyme in the state of a uniform dispersion and while maintaining its activity at a high level, even though the candy product has been prepared through the step of thermal treatment. Further, the candy product also entraps highly pressurized inert gas in the form of fine bubbles, so that pleasant sounds will issue, as the candy dissolves in the mouth, to give a nice or pleasant feeling for the consumer.

PREFERRED EMBODIMENTS OF THE INVENTION

The invention will now be explained in more detail, with reference to Examples.

EXAMPLE 1

A mixture of sugar (30 parts by weight), corn syrup (40 parts by weight), lactose (30 parts by weight) and water (30 parts by weight) was charged in a kettle with a jacket for steam heating to concentrate the mixture until its temperature become 150° C., so that a concentrate with a moisture content of less than 3.0% by weight was obtained. The concentrate was poured into a cooling pan to obtain a mass of hard candy which was crushed with use of disc-type mill to obtain candy particles having a size passing through JIS 100 mesh standard sieve.

To 100 parts by weight of the resulting hard candy particles, 0.5 parts by weight of cellulase powder were mixed. The powdery mixture was charged in a cylindrical receptacle having an inner diameter of 10 cm and shaped under pressure of 250 kg/cm$^2$.

The resulting shaped mass was put into a pressure vessel with a jacket. After having sealed the vessel and charged carbon dioxide gas to increase an inner pressure thereof to 35 kg/cm$^2$, overheated water steam was fed into the jacket to heat the shaped mass at 125° C., so as to cause a partial melt of the candy particle of the shaped mass.

Thereafter, water of room temperature was fed into the jacket, in lieu of the steam, until temperature of a candy piece converted from the shaped mass becomes 25° C. Then, the pressure in the vessel was released by recovering carbon dioxide gas therefrom to take out the candy piece containing enzyme therein and entrapping carbon dioxide gas in pressurized state in the form of fine bubbles.

Activity of cellulase in the resulting candy product was checked and found to be 100%. This determination was made by comparing the activity of the enzyme in the candy to the known activity of the enzyme measured as the amount of glucose formed when the enzyme is used to decompose carboxymethylcellulose. Almost no reduction in enzymatic activity was recognized, even if the candy product has been stored for one month at 25° and 35° C., respectively.

The candy product gives a smooth feeling to the tongue, issues pleasant sounds in the mouth, as it dissolves therein, and assists the digestion of fibrous foods.

EXAMPLE 2

An enzyme containing hard candy was prepared in the manner similar to Example 1, except that amylase powder was employed, in lieu of cellulase powder and nitrogen gas was employed, in lieu of cellulase powder and nitrogen gas was selected as the inert gas to set the inner pressure of the vessel at 5 kg/cm$^2$.

The enzymatic activity of the candy product was determined to be 80% which value was determined by comparing the activity of the enzyme in the candy to the known activity of the enzyme measured as the amount of glucose formed as a decomposition product of soluble starch. Almost no reduction in enzymatic activity was recognized, even when the candy product has been stored for one month at 35° C.

The candy product gives a smooth feeling to the tongue, issues pleasant sounds in the mouth, as it dissolves therein, and assists digestion of starchy foods.

EXAMPLE 3

An enzyme containing candy was prepared in the manner similar to Example 1, except that amylase powder was employed, in lieu of cellulase powder.

The remaining enzymatic activity of the candy product was 80% as measured in accordance with Example 2. Almost no reduction in enzymatic activity was recognized, even when the candy product has been stored for two months at 35° C. and for one month at 40° C.

The candy product gives a smooth feeling to the tongue, issues pleasant sounds in the mouth as it dissolves therein, and assists a digest of starchy foods.

From the results shown in Examples 1 to 3, it can be said that the candy product to be obtained by the process according to the invention does not show any noticeable reduction in its enzymatic activity, even when it is stored under the condition of relatively high temperature, as in the summer season.

EXAMPLE 4

Three kinds of enzyme containing hard candies were prepared in the manner similar to Example 1, except that protease, lipase or lysozyme powder is employed, in lieu of the cellulase powder.

The remaining enzymatic activity of each candy product is shown in Table 1. In the Table, the remaining enzymatic activity is designated by % which was given as comparison value in an amount of the substance dissolved by trichloroacetic acid to be formed by decomposition of casein (for protease), comparison value in an amount of fatty acids to be formed as decomposition product of triglyceride (for lipase), and comparison value of bacteriolytic ability of Micrococcus lisodeikticus (for lysozyme).

TABLE 1

| Enzyme | Remaining enzymatic activity in product |
|---|---|
| Protease | 95% |
| Lipase | 85% |
| Lysozyme | 98% |

EXAMPLE 5

Hard candies containing an enzyme were prepared as in Example 1, except that various gases were employed in various pressure, as shown in the following Table 2.

The remaining enzymatic activity of each candy product is shown in Table 2, the activity being measured as in Example 1.

TABLE 2

| Gas Used | Pressure ($kg/cm^2$) | Remaining activity (%) |
| --- | --- | --- |
| Carbon dioxide | 35 | 100 |
| Carbon dioxide | 5 | 90 |
| Carbon dioxide | 1 | 50 |
| Nitrogen | 35 | 95 |
| Nitrogen | 5 | 85 |
| Nitrogen | 3 | 40 |
| Air | 35 | 25 |
| Air | 1 | 30 |

Apparently, as seen from Table 2, a remarkable reduction in enzymatic activity will occur, when air is employed as the pressurizing gas. Contrary, thereto, the enzymatic activity will be reserved at 85% or more by using carbon dioxide gas or nitrogen gas at a pressure of 5 $kg/cm^2$ or more. When carbon dioxide gas is selected, the enzymatic activity was preserved in the level of 50%, even though pressure is set to only 1 $kg/cm^2$.

WHAT IS CLAIMED IS:

1. A process for the preparation of a hard candy containing an enzyme, which comprises the steps of:

mixing saccharide materials with water, concentrating the same to make the moisture content of the saccharide material not higher than 3.0% by weight;

cooling the concentrate to cause solidification thereof; crushing the resulting candy mass to make candy particles having a size passing through 100 mesh standard sieve by the Japanese Industrial Standards (JIS);

adding and mixing about 1 part by weight of the enzyme with 100 parts by weight of the candy particles to uniformly disperse the enzyme in a mass of the candy particles;

press shaping the particle mixture into a candy mass;

putting the mass in a pressure vessel;

charging an inert gas into the pressure vessel to set an inner pressure of the vessel at a pressurized state of at least 1 $kg/cm^2$;

heating the vessel to between about 100-140° C. to cause a partial melt of the candy mass;

cooling the vessel to solidify the partially melted candy mass and to convert the same into the desired candy product in the vessel; and then releasing the pressure in the vessel to remove the candy product.

2. The process of claim 1, wherein said enzyme is at least one selected from the group consisting of cellulase, amylase, protease, lipase, lysozyme and dextranase.

3. The process of claim 1, wherein the inert gas is selected from the group consisting of carbon dioxide gas and nitrogen gas.

4. The process of claim 1, wherein said inert gas is charged in the pressure vessel to set an inner pressure of 1-50 $kg/cm^2$.

* * * * *